Figure 1:
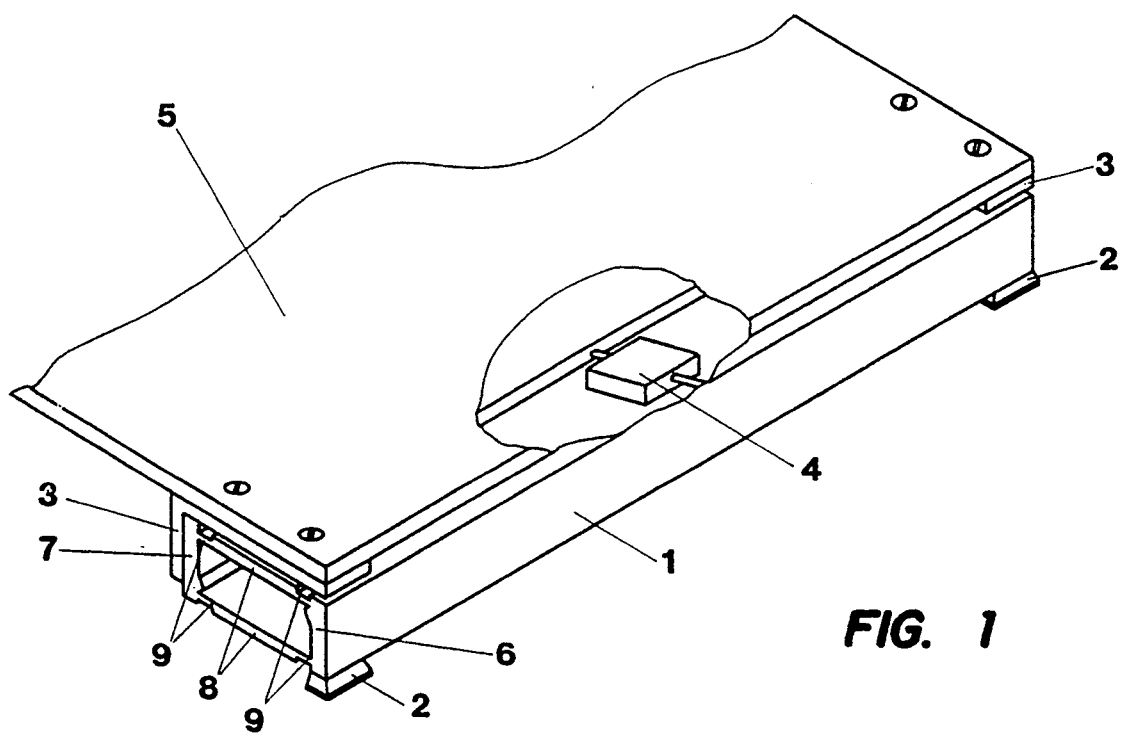

United States Patent [19]
Wirth

[11] Patent Number: 5,365,022
[45] Date of Patent: Nov. 15, 1994

[54] TWO POINT LOAD CELL

[75] Inventor: Johannes Wirth, Zurich, Switzerland

[73] Assignee: Wirth Gallo Messtechnik AG, Zurich, Switzerland

[21] Appl. No.: 955,742

[22] PCT Filed: Jun. 18, 1992

[86] PCT No.: PCT/CH92/00116
§ 371 Date: Dec. 7, 1992
§ 102(e) Date: Dec. 7, 1992

[87] PCT Pub. No.: WO93/00575
PCT Pub. Date: Jan. 7, 1993

[30] Foreign Application Priority Data
Jun. 24, 1991 [CH] Switzerland ............ 01859/91-7

[51] Int. Cl.⁵ ............ G01G 3/08; G01G 11/14; G01L 1/22
[52] U.S. Cl. ............ 177/229; 177/16; 73/862.627
[58] Field of Search ............ 177/229, 16; 73/862.627

[56] References Cited
U.S. PATENT DOCUMENTS
4,655,306 4/1987 Saner ............ 177/229
4,682,664 7/1987 Kemp ............ 177/16

FOREIGN PATENT DOCUMENTS
WO89/01611 2/1989 WIPO.

Primary Examiner—George H. Miller, Jr.
Attorney, Agent, or Firm—Johnson & Wortley

[57] ABSTRACT

The rod-shaped load cell consists of a guide section (1), which is subdivided into a frame (6) and a load-bearing element (7), and two parallel, rigid plates (8) connecting the two cited elements. Plates (8) are connected to both frame (6) and load-bearing element (7) by band-shaped flexural joints (9) which extend across the overall length of guide section (1). The load cell rests via frame (6) upon two feet (2) located outermost on rod-shaped guide section (1). The platform (5) rests upon two mounting elements (3) also located outermost on guide section (1), with the mounting elements (3) acting on load-bearing element (7). A force sensor (4) is diagonally installed at half the length of guide section (1). When platform (5) is loaded, tensile force acts upon force sensor (4) (see FIG. 1).

2 Claims, 6 Drawing Sheets

TWO POINT LOAD CELL

The measurement of linear or two-dimensional loads by means of modern electromechanical dynamometric devices involves special problems. If a single load cell is used for a platform type scale, which by its nature has only a single point of load or force input, then limitations arise with respect to the size of the platform, due to the existence of the so-called angular load error. This also applies in a similar manner with respect to linear measuring devices, such as overhead rail scales. Consequently, numerous dynamometric cells are used for large, high-capacity platforms and long overhead rail gauge lengths, usually three to four cells for platforms, and two cells for overhead rail gauge lengths. Since under current conditions the use of four dynamometric cells is not economical until platform sizes of approximately 2×2 meters or greater for large-capacity scales are involved (with the same applying for overhead rail scales), an area size becomes involved at which platform scales become either too imprecise or too expensive. In the case of smaller high-capacity scales, there is still an option of stiffening metrologically vital components, although this can basically only be achieved through taller design configurations.

The goal of the invention described herein is to create a load cell which favorably allows the simple and economic and construction of larger and lower platform scales and longer overhead rail gauge lengths.

The solution to the problem described is set forth in patent claim 1. The concept of the invention is explained through numerous design variants shown in the attached drawings:

FIG. 1=An initial example of a load cell built into a platform scale.

Figure 2:
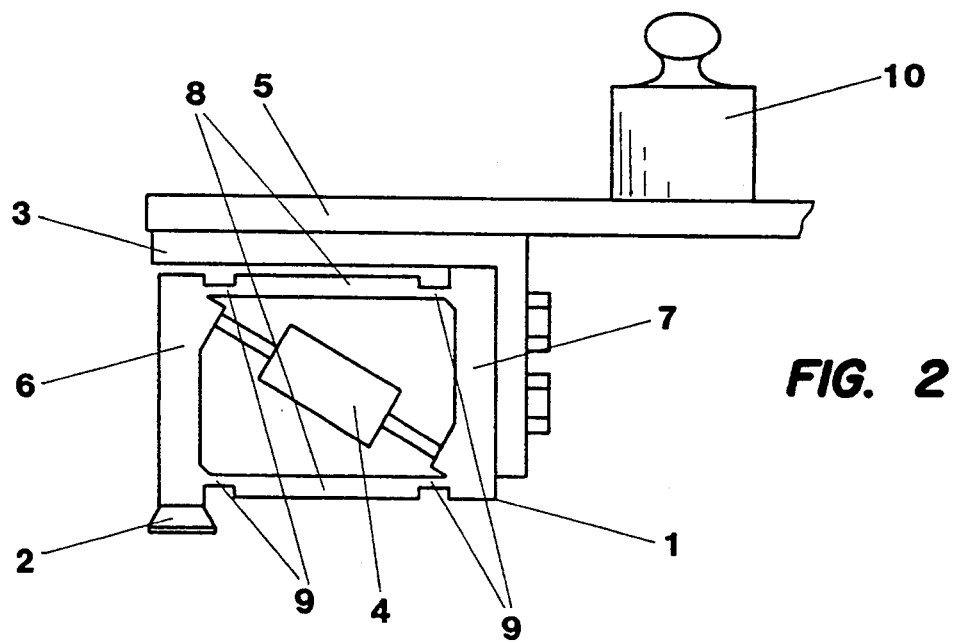

FIG. 2=A cross-section through the design variant shown in FIG. 1.

Figure 3A:
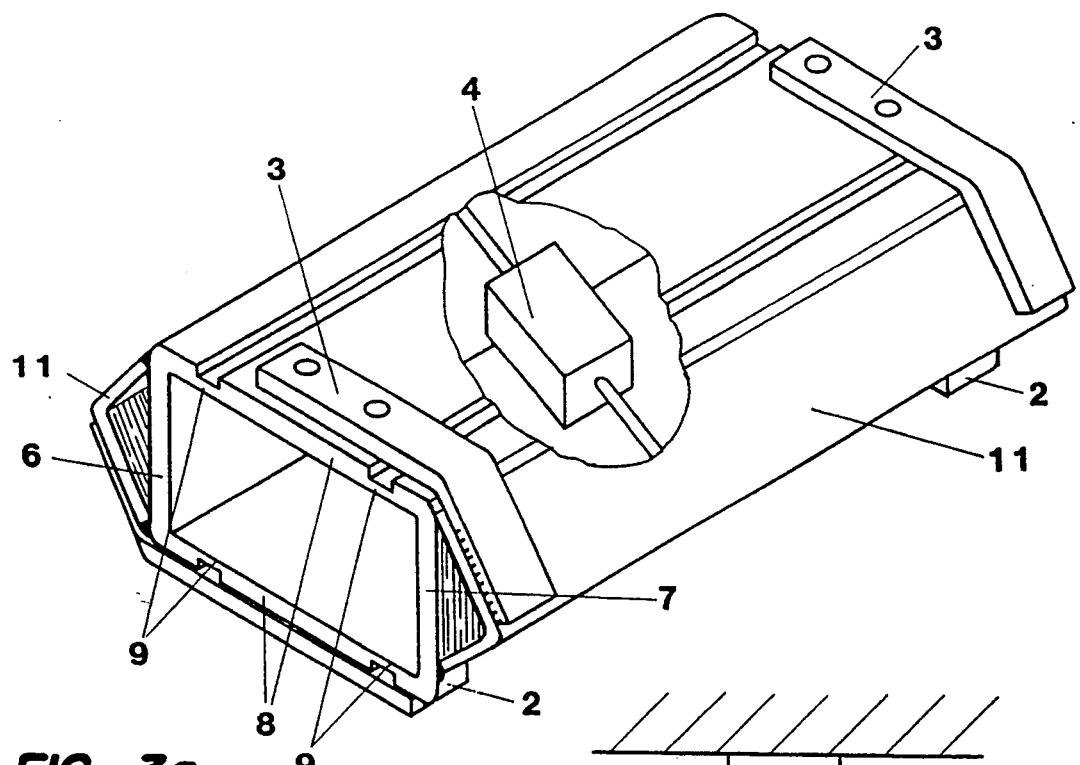

FIG. 3a=A second design variant of a load cell with a welded section.

Figure 3B:
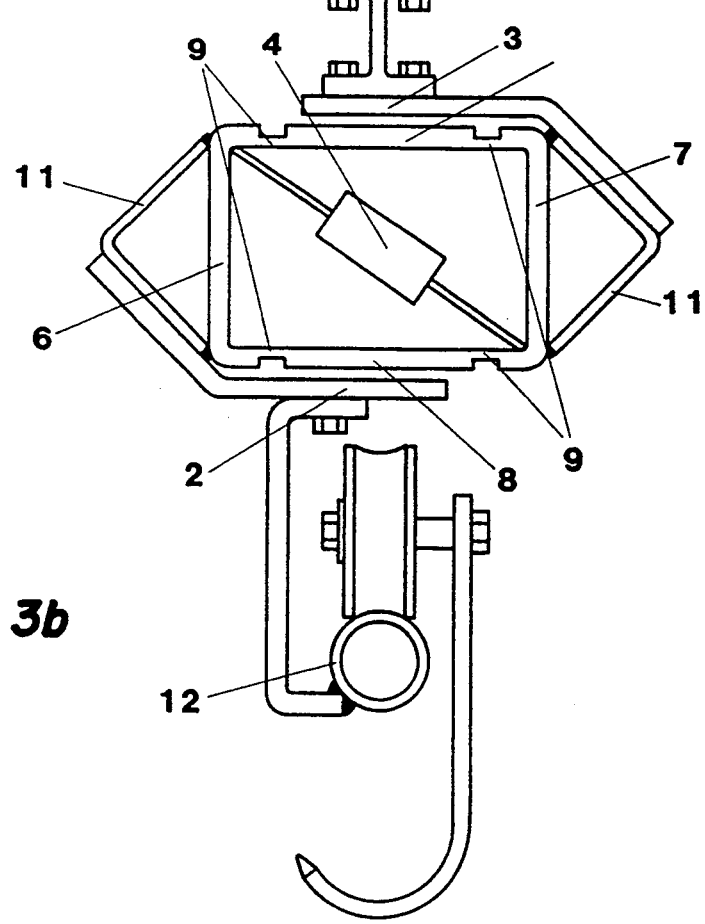

FIG. 3B=a perspective view of the design variant shown in FIG. 3 used as a hanging scale.

Figure 4:
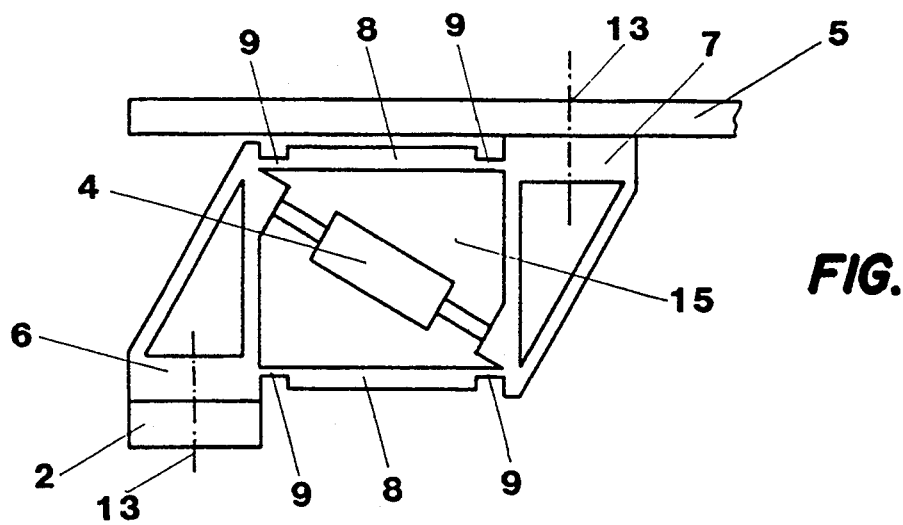

FIG. 4=A third design variant of a load cell with an extruded section.

Figure 5:
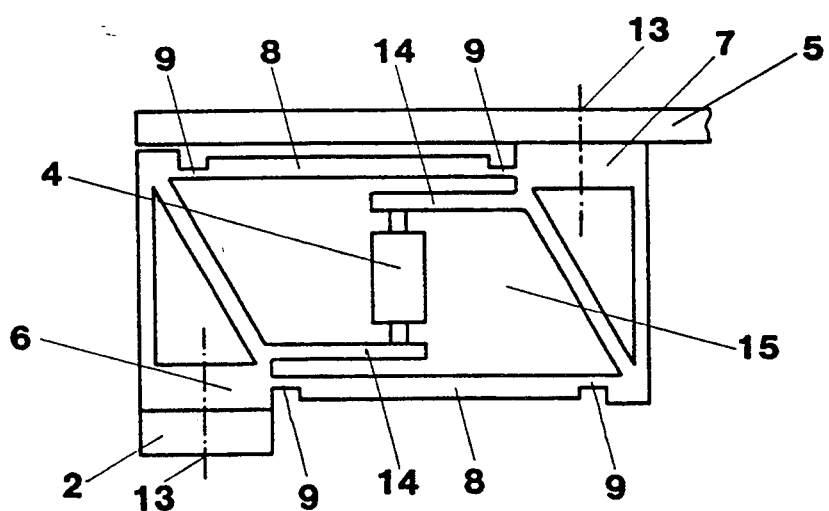

FIG. 5=A fourth design variant of a load cell with an extruded section.

Figure 6:
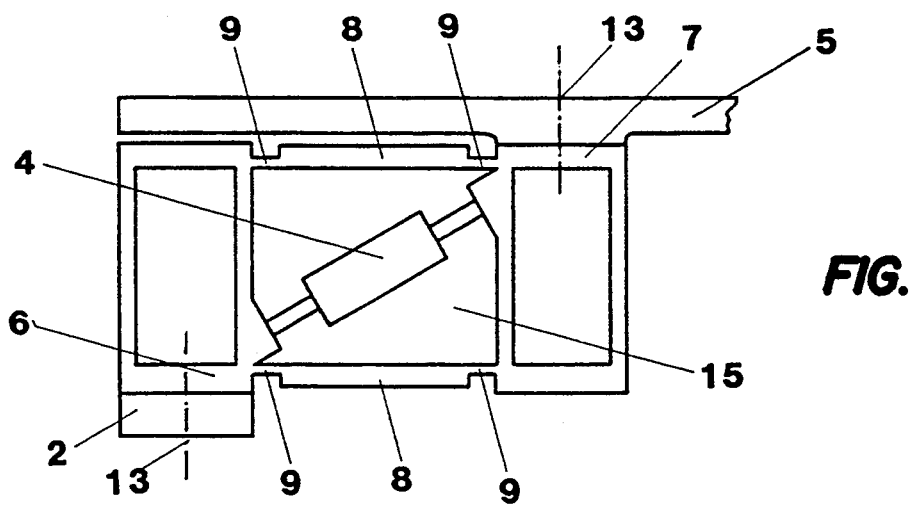

FIG. 6=A fifth design variant of a load cell with an extruded section.

Figure 7A:
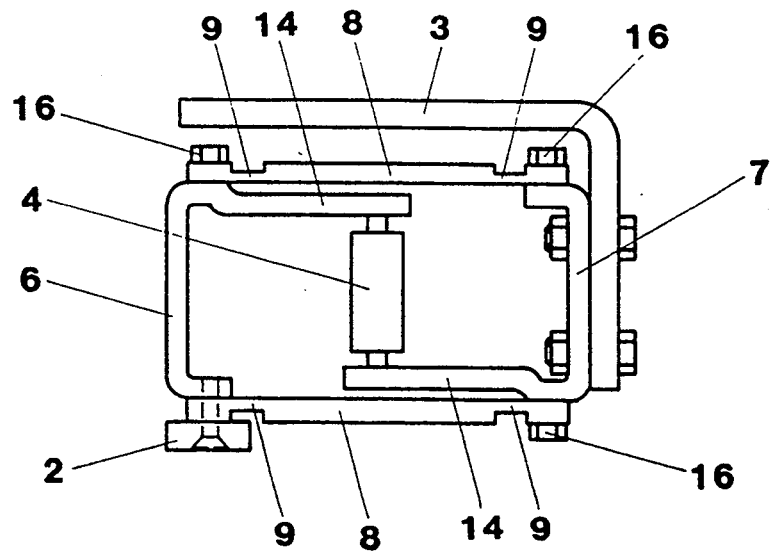

FIG. 7a, b=A sixth design variant of a load cell with a bolted section.

Figure 8:
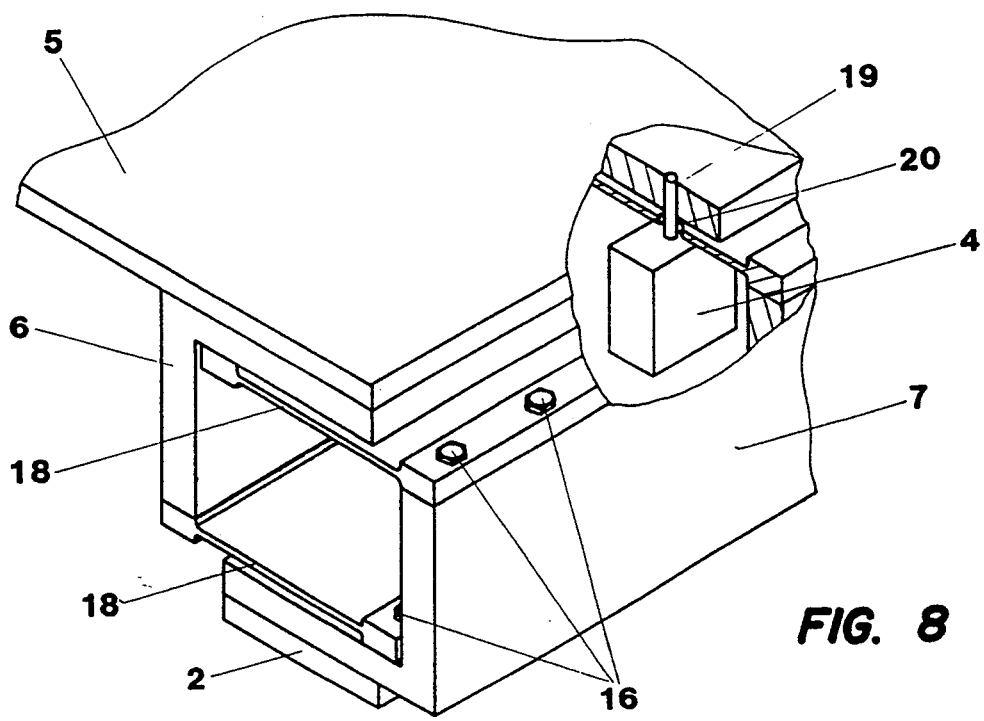

FIG. 8=A seventh design variant of a load cell with a bolted section.

Figure 9:
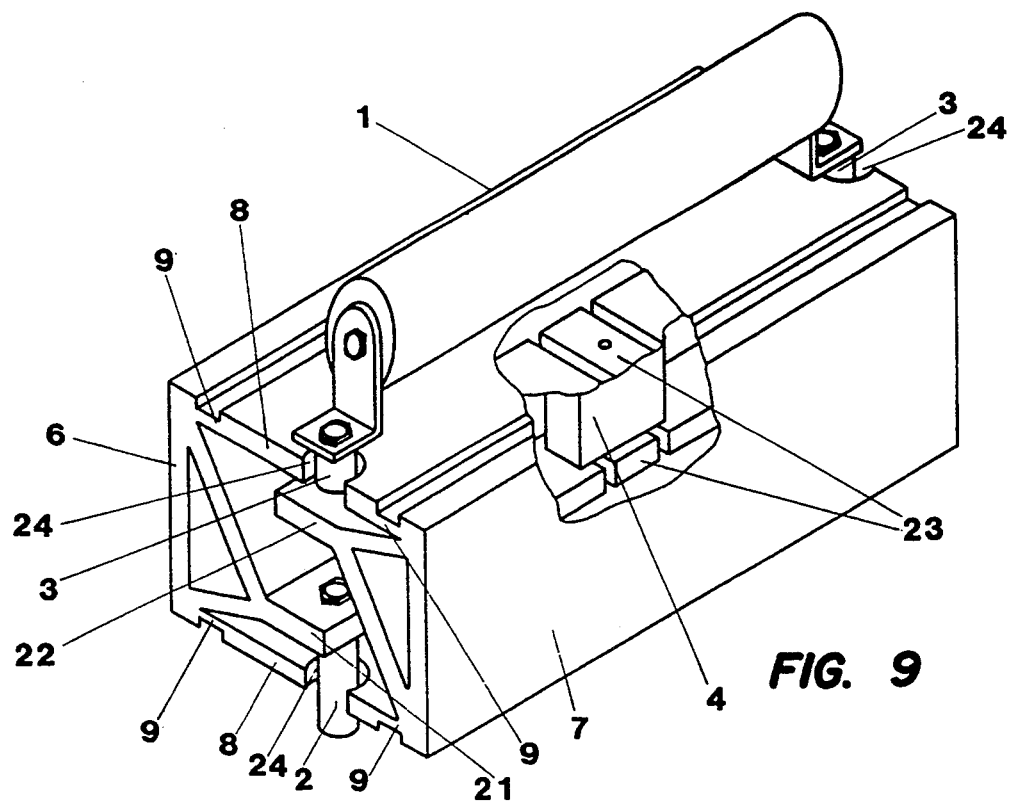

FIG. 9=An eight design variant of a load cell with an extruded section, installed in a conveyor belt scale.

Figure 10:
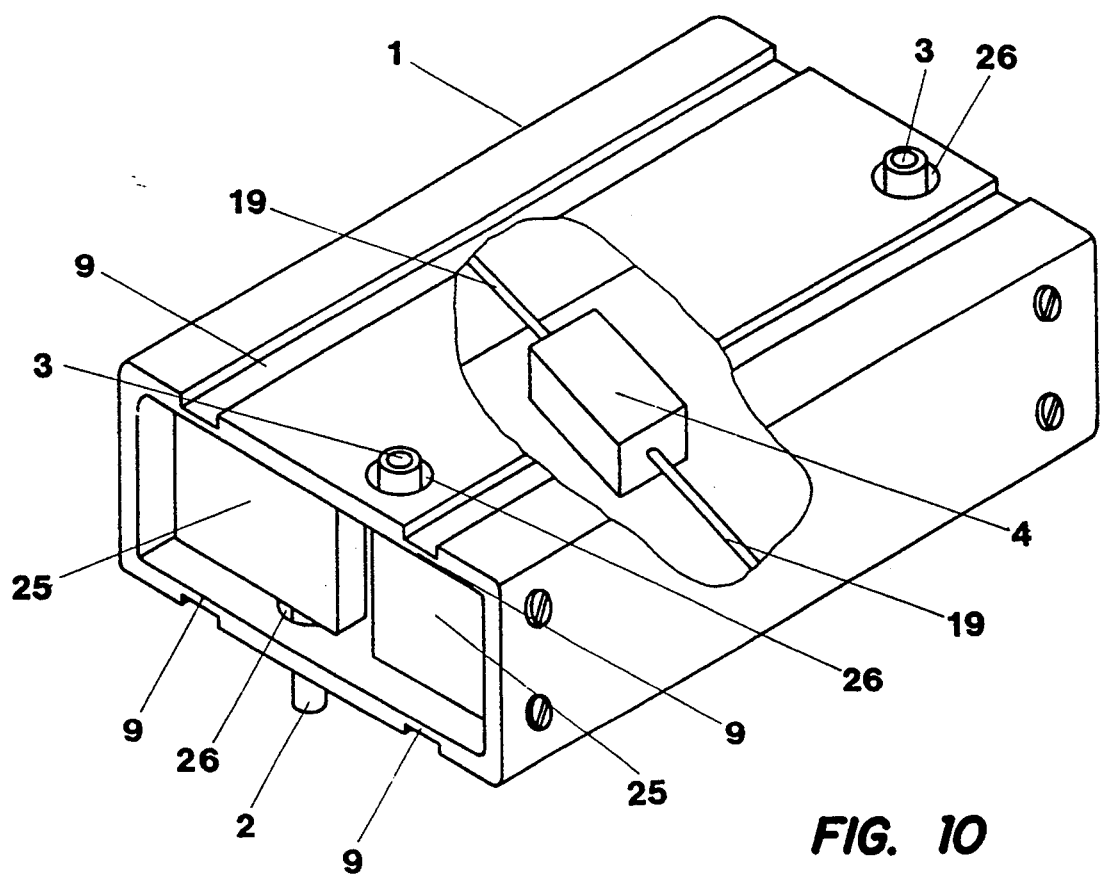

FIG. 10=A ninth design variant of a load cell with a pressed section.

FIG. 1 shows the perspective of a partially cutaway view of a portion of a platform scale containing the initial design variant of a load cell as described herein. FIG. 2 shows a cross-section of the same arrangement.

A longitudinal guide section 1, consisting of a rod-shaped frame 6, a rod-shaped load-bearing element 7, and two rod-shaped plates 8 with band-shaped flexural joints, extending across the overall length of guide section 1, rest, with frame 6, on two feet 2, which are attached to the outermost exterior of frame 6. Two elbowed mounting elements 3 are attached to load-bearing element 7 at the same longitudinal position as the feet, and support a platform 5 on one side of each of the mounting elements. There is an identical load cell on the other side of platform 5 (not shown), located in axial symmetry to the first load cell.

The longitudinal extension of guide section 1 is such as to amount to a multiple of its lateral dimension.

A force sensor 4 is located in a diagonal position at half the length of guide section 1. If platform 5 is loaded by the weight of a mass 10, then the force flow is distributed in accordance with the elasticity of flexural joints 9 and that of force sensor 4, modified by the angular position of force sensor 4. Thus, what is involved is a reduction in the elasticity of flexural joints 9 and the inherent or installed elasticity of force sensor 4. The type of force sensor 4 involved can be all currently known types, such as strain gauges, and piezoelectric, optoelastic, and string sensors.

Due to the high rigidity of plate 8 of frame 6 and of load-bearing element 7, compared to that of flexural joints 9, it is possible to reduce the angular load error of a platform scale of the type shown in FIGS. 1 and 2. The weight of a mass 10 is, as is known, determined through the summation of the data provided by the two force sensors 4.

The design variant shown in FIGS. 3A and 3B illustrate a load cell as described herein, installed in a overhead rail scale. Guide section 1 consists in this instance of a pressed, square-sectioned tube.

Frame 6 and load-bearing element 7 are additionally stiffened respectively by a welded-on elbow fitting 11. The flexural joints were milled out. The feet 2 and mounting element 3 consist of angle irons welded onto elbow fittings 11. Mounting element 3 supports the load cell and thus, via feet 2, a rail section 12 of the overhead rail, upon which a load is weighed. The force sensor is again located at half the length of guide section 1, as basically applies for all of the design variants described herein.

Where force sensor 4 in the design variants shown in FIGS. 1 and 2 responds to tensile force, in this instance pressure force acts upon the force sensor. The diagonal installation of force sensor 4 represents one design option, and is favorable in the case of force sensor 4, in that relatively high inherent flexibility is provided, but in no way forced, as is shown in the subsequent design variants. Use in overhead rail scales is, of course, in no way limited to these design variants of the load cell described herein.

The section of the design variant shown in FIG. 4 is known from European Patent Application 88 902 114.0. In that design, however, only a short section is used for a single-point load cell in a size limited to use in a platform scale. In the case of the design variant shown here in FIG. 4, and in all subsequent design variants described herein, where, in each instance, only one section cross-section is shown, the design concept of guide section 1, shown in FIG. 1, is always involved. In this instance guide section I consists of a triangular frame 6, a triangular load-bearing element 7, and two plates 8, which are connected to frame 6 or load-bearing element 7 via flexural joints 9. Both triangular components—frame 6 and load-bearing element 7—are so arranged that respective force levels are introduced at the shortest side of the triangle. Force sensor 4 is installed diagonally in the rectangular cavity 15 located between plate 8 and the vertical lateral sides of the cited triangles of frame 6 and load-bearing element 7. The diagonal extends from the top end of frame 6 to the bottom end of load-bearing element 7. The connections to foot 2 and platform 5 are typically made via schematically indicated bolts.

In the design variant shown in FIG. 5, the triangles of frame 6 and load-bearing element 7 are so formed that their vertical sides come to externally lie against guide section 1. Two tongues 14 extend from both frame 6, as well as from load-bearing element 7, into a, in this instance, parallelogram-shaped cavity 15. Compared to the flexural hardness of flexural joints 9, these tongues 14 are designed to be plaint, so as to create reduced elasticity between flexural joints 9 and tongues 14. The reduction ratio, as always, includes the inherent elasticity of force sensor 4, which, in this instance, is designed to be elastically hard.

FIG. 6 shows a design variant of the load cell described herein in which the sections designated as frame 6 and load-bearing element 7 are designed as upright rectangles. Again, force sensor 4 is diagonally installed in cavity 15 and extends from the bottom end of frame 6 to the top of load-bearing element 7. As in the design variant shown in FIG. 5, force sensor 4 is impacted by pressure force via the loading of platform 5. The section of the design variants shown in FIGS. 4, 5, and 6, are preferably achieved through extrusion. Reworking through metal-cutting is then limited to corrections to flexural joints 9 and notching of tongues 14.

Figure 7B:
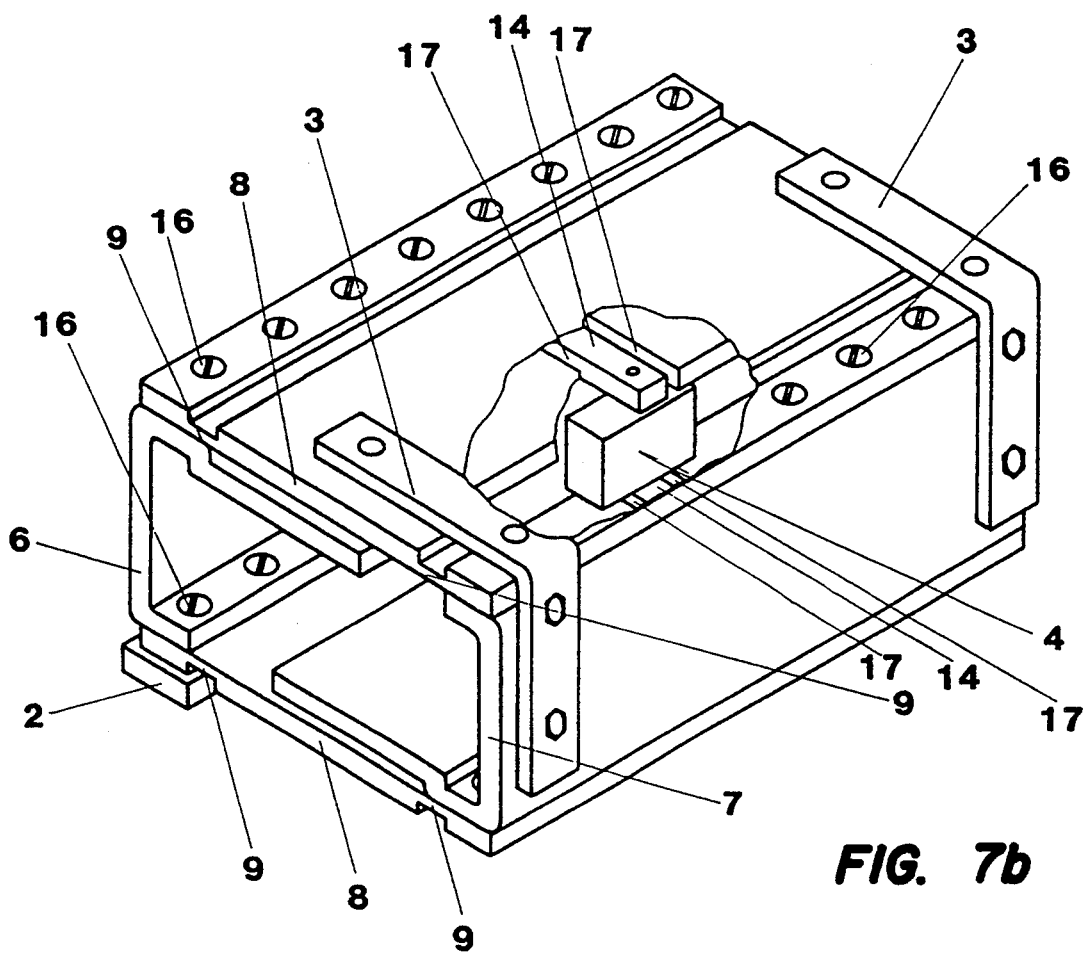

Unlike the design variants described so far, the guide section 1 shown in FIGS. 7A and 7B are bolted together from numerous sections. Frame 6 and load-bearing element 7 consist of typically identical, asymmetrical channels. One side of one of the plates 8 is attached via numerous bolts 16 to the shorter side of each channel, with the longer side being offset. The other side of one of the plates 8 is also attached via numerous bolts 16 in front of the offset, with the offset portion providing the section for each tongue 14 located in the center portion of guide section 1 via two respectively made notches within the widths of the tongues, as shown in FIG. 7. Again, two elbowed mounting elements 3 are externally attached to the load-bearing element, to which a platform 5 can be attached. In this instance, force sensor 4 is tensile force-loaded.

In the design variant shown in FIG. 8, frame 6 and load-bearing element 7 are each identically and angularly designed. Each has a single plate 18, instead of plates 8 with flexural joints 9. Although the interface area where the plate is connected to frame 6 or load-bearing element 7 via bolts 16, is designed to be strong, there is slight, but constant strength across the overall remainder of its width. The top plate 18 is bolted at the vertical side of the angular section forming frame 6 and at the inner side of the angular section forming load-bearing element 7, in the area of the corners of the plates. The same applies with respect to the bottom plate 18 (with the switching of frame 6 and load-bearing element 7). Loading of platform 5 results in the 5-shaped bending of plate 18. Force sensor 4 is directly connected to the horizontal sides of frame 6 and load-bearing element 7. Connection occurs via two pins guided through plates 18 through respective borings 20.

FIG. 9 shows another design variant installed in a conveyor belt scale, which is only shown schematically. Two feet 2 and two mounting elements 3 (in this instance, designed as heavy supports) are so arranged that each mounting element 3 is coaxial to each foot 2. Guide section 1, as described herein, consists of two triangular sections. Both frame 6, as well as load-bearing element 7, each support a rod 21 or 22, extending across the overall length of guide section 1, with the arrangement being such that rods 21 and 22 run horizontally and in parallel to one another and over one another, as shown in FIG. 9. The feet 2 support rod 21, while rod 22 supports mounting elements 3. Rods 21 and 22 are notched laterally to the longitudinal axis of guide section 1 in the center of guide section 1, which creates tongues 23, similar to tongues 14 shown in FIG. 7. Guide section 1 of the design variant shown in FIG. 9, is also typically produced by extrusion, including the incorporation of flexural joint 9. This does not, however, exclude possible reworking through metal-cutting. Both feet 2, as well as mounting elements 3, are guided through plates 8 via borings 24, similar to that of the borings 20, shown in FIG. 8.

In the design variant shown in FIG. 10, guide section 1 is typically produced from a pressed, square-sectioned tube, with plates 8 forming the horizontal, and frame 6 and load-bearing element 7 forming the vertical sides of the cited square-sectioned tube. Flexural joints 9 can be applied in the course of the same production sequence and, where necessary, be reworked via metal-cutting, or, produced entirely through metal-cutting. Both feet 2 (only one foot is visible in FIG. 10), as well as mounting elements 3, are attached to units 25 and channeled out of guide section 1 via borings 26. Units 25 are bolted to the side walls of guide section 1, only touch guide section 1 at these points, and extend laterally to the longitudinal axis of guide section 1 into the interior of guide section 1. Force sensor 4 passes diagonally through guide section 1 within the center plane, and is typically attached to guide section 1 via pins 19. When platform 5 (not shown), which lies on mounting elements 3, is loaded, the cited diagonal of guide section 1 is extended and force sensor 4 is thus loaded by tensile force. In a variant of FIG. 10 (not shown) the force sensor is installed in the other diagonal, and is thus impacted by pressure force.

It is claimed:

1. Rod-shaped load cell with two load-input points, characterized by the fact that:

the load cell consists of a guide section (1) subdivided into a frame (6), a load-bearing element (7), and two generally parallel plates (8), connecting frame (6) and load-bearing element (7), with both the connections between frame (6) and plates (8), and between plates (8) and load-bearing element (7), being designed as band-shaped flexural joints (9), extending across the overall length of guide section (1);

the load cell further consists of two feet (2), each attached to one end of frame (6); two mounting elements (3), each attached to one end of Load-bearing element (7); a force sensor (4), installed between frame (6) and load-bearing element (7) in the center of guide section (1); with the flexural strength of frame (6), load-bearing element (7), and plates (8), being greater than that of flexural joints (9); and with the longitudinal extension of guide section (1) being a multiple of its lateral dimensions; and further characterized by the fact that:

guide section (1) consists of an extruded section and consists of two essentially parallel plates (8) and two triangular sections, with both sides of plates (8) being respectively connected by two flexural Joints (9), with the triangular sections, with the downwards expanding triangle forming frame (6), and the upwards expanding triangle forming load-bearing element (7);

each of the cited triangular sections has a vertical side forming the external demarcation of guide section (1), while the two other sides of the triangular sections extend towards the interior of guide section (1);

the triangular sections of frame (6) and load-bearing element (7) each support a horizontal, flat rod (21,22) extending across the overall length of the guide section (1), with the arrangement so designed that the rods (21,22) run horizontally, in parallel, and over each other;

each one of plates (8) has two borings (24), located at the ends of guide section (1);

feet (2) pass through the borings of bottom plate (8), supporting bottom rod (21) connected to frame (6), while mounting element (3) passes through borings (24) in top plate (8), supporting rod (22) connected to load-bearing element (7), resulting, in each instance, in a foot (2) and a mounting element (3) lying along the same vertical axis;

force sensor (4) is installed in a vertical position between rods (21) and (22).

2. Load cell, as described in patent claim 1, characterized by the fact that both rods (21) and (22) are notched at half the length of guide section (1), laterally to the longitudinal axes of the rods, in the process respectively forming a tongue (23), with force sensor (4) installed in vertical position between tongues (23).

* * * * *